Figure 1:
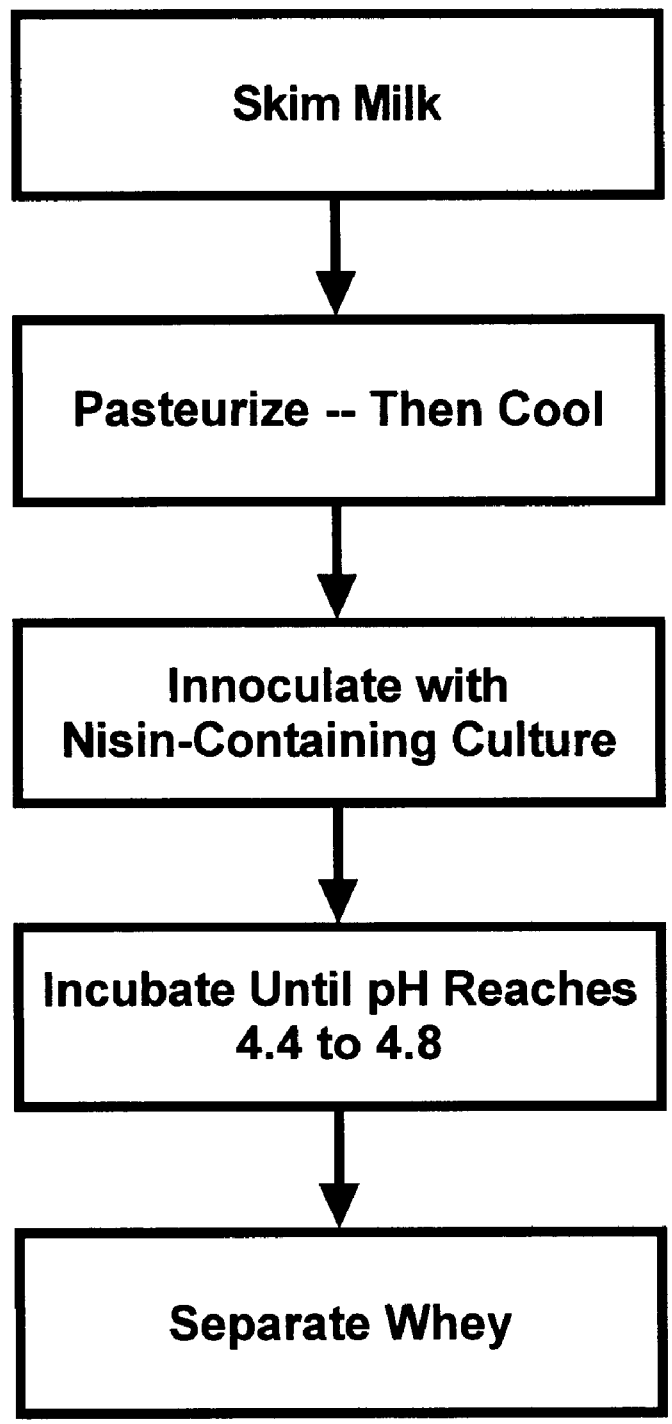

United States Patent [19]
Nauth et al.

[11] Patent Number: 6,110,509
[45] Date of Patent: Aug. 29, 2000

[54] STABILIZATION OF CREAM CHEESE COMPOSITIONS USING NISIN-PRODUCING CULTURES

[75] Inventors: K. Rajinder Nauth, Wheeling; Mary Lynum, Schaumburg, both of Ill.

[73] Assignee: Kraft Foods, Inc., Northfield, Ill.

[21] Appl. No.: 09/386,795

[22] Filed: Aug. 31, 1999

Related U.S. Application Data

[60] Provisional application No. 60/098,472, Aug. 31, 1998.

[51] Int. Cl.⁷ .................................................. A23C 21/00
[52] U.S. Cl. .............................................................. 426/41
[58] Field of Search .................................. 426/34, 36, 41, 426/580, 582, 38, 39, 40, 42, 43

[56] References Cited

U.S. PATENT DOCUMENTS

| | | | |
|---|---|---|---|
| 4,584,199 | 4/1986 | Taylor | 426/36 |
| 4,597,972 | 7/1986 | Taylor | 426/36 |
| 4,740,593 | 4/1988 | Gonzalez et al. | 435/243 |
| 4,798,729 | 1/1989 | Anders et al. | 426/326 |
| 4,888,191 | 12/1989 | Anders et al. | 426/281 |
| 5,015,487 | 5/1991 | Collison et al. | 426/332 |
| 5,017,391 | 5/1991 | Anders et al. | 426/129 |
| 5,186,962 | 2/1993 | Hutkins et al. | 426/61 |
| 5,338,682 | 8/1994 | Sasaki et al. | 435/253.4 |
| 5,451,369 | 9/1995 | Daeschel et al. | 422/28 |
| 5,458,876 | 10/1995 | Monticello | 424/94.61 |

OTHER PUBLICATIONS

Kosikowski, F., Cheese and Fermented Milk Foods, Second Edition, 1977, Edwards Brothers, Inc, Ann Arbor, MI, pp. 144–167.

Chung et al., "Effects of Nisin on Growth of Bacteria Attached to Meat", Applied and Environmental Microbiology, Jun. 1989, vol. 55, No. 6, pp. 1329–1333.

Maas et al. "Sodium Lactage Delays Toxin Production by Clostridium botulinum in Cook–in–Bag Turkey Products", Applied and Environmental Microbiology, Sep. 1989, vol. 55, No. 9, pp. 2226–2229.

*Primary Examiner*—Leslie Wong
*Attorney, Agent, or Firm*—Fitch, Even, Tabin & Flannery

[57] ABSTRACT

The present invention provides a stabilized cream cheese composition comprising a product of a nisin-producing fermentation. The product may be a cream cheese fermentation mix fermented with a nisin-producing culture, or it may be nisin-containing whey; alternatively the cream cheese composition may comprise both products. The stabilized cream cheese composition described inhibits the growth of objectionable or pathogenic microorganisms. The invention also provides a method of making a stabilized cream cheese composition, and a method of inhibiting the growth of an objectionable or pathogenic microorganism in a cream cheese composition.

12 Claims, 3 Drawing Sheets

STABILIZATION OF CREAM CHEESE COMPOSITIONS USING NISIN-PRODUCING CULTURES

This application is based upon provisional application U.S. Ser. No. 60/098,472 filed Aug. 31, 1998.

FIELD OF THE INVENTION

This invention relates to stabilization of cream cheese compositions against the growth of objectionable or pathogenic microbiological contaminants. The stabilized compositions are attained by the incorporation of nisin-containing whey derived from a nisin-producing culture or the curds obtained from such a culture. The invention also relates to methods of stabilizing a cream cheese composition against the growth of microbiological contaminants, wherein the method comprises adding nisin-containing whey derived from a nisin-producing culture, or the curds from such a culture, to the composition.

BACKGROUND OF THE INVENTION

Cream cheese compositions are generally high fat products obtained as the curds from cream cheese type lactic fermentations. They contain about 55% moisture, 32–34% fat, 5–7% protein, and 2–3% lactose. The consistency of these compositions, permitting spreadability while retaining firmness, is modulated by the addition of vegetable gums to them. Cream cheeses are mildly acidic, having pH values around 4.5 to 5.0. Their delicate buttery flavor is generally ascribed to the presence of volatile organic flavoring compounds such as diacetyl. The preparation of cream cheese compositions includes culturing a cream cheese fermentation mix to a pH of about 4.5 to 4.6, exposing the result to temperatures of about 180° F. for a brief time, centrifuging to separate the cream cheese curd from the whey, blending the hot curd, at about 175° F., with a dry blend of vegetable gum and salt, and cooling prior to packaging.

A difficulty with present cream cheese products is that, although they are generally stable and have an extended storage life at refrigerated temperature, they tend to lose flavor and develop bacterial or mold growth upon prolonged storage. The microbiological contaminants may, in general, include both bacteria, such as various examples from the genus Bacillus, various mesophilic and thermophilic cocci, and a variety of molds and yeasts. A variety of possible origins for these contaminants exists. They may originate in the ingredients used in the preparation of the cream cheeses, and be such that they survive the elevated temperatures used in the manufacturing process. They may be airborne or surface borne in the facilities used in manufacture. Additionally they may be present on the containers and wrappings used in packaging the final product for shipment and sale.

Nisin is a peptide-like antibacterial substance produced by microorganisms such as *Lactococcus lactis* subsp. lactis (formerly known as *Streptococcus lactis*). Its structure is illustrated in U.S. Pat. No. 5,527,505 to Yamauchi et al. The highest activity preparations of nisin contain about 40 million IU per gram. A commercial preparation, NISAPLIN®, containing about 1 million IU per gram is available from Aplin & Barrett Ltd., Trowbridge, England. Nisin has no known toxic effects in humans. It is widely used in a variety of prepared dairy foods. Experimental use in preserving other foods has also been reported. The cultures that produce nisin, being lactic fermentations, generally produce lactate as well.

A number of efforts have been reported since 1975 directed to reducing uncoupled acid production in dairy fermentations by controlling the post-fermentation acidification of yogurt. In some of these studies, a nisin producing culture was introduced in an attempt to inhibit these effects. Kalra et al. (Indian Journal of Dairy Science 28: 71–72 (1975)) incorporated the nisin producing culture *Streptococcus lactis* (now known as *L. lactis* subsp. lactis) along with the yogurt culture before fermentation. Others introduced nisin in milk prior to fermentation (Bayoumi, Chem. mikrobiol. technol. lebensm. 13:65–69 (1991)) or following fermentation (Gupta et al., Cultured Dairy Products Journal 23: 17–18 (1988); Gupta et al., Cultured Dairy Products Journal 23: 9–10 (1989)). In all cases, the rate of post-fermentation acidification was only partially inhibited by these treatments and the yogurt continued to become more acidic throughout its shelf life.

In U.S. Pat. No. 5,527,505, by Yamauchi et al., yogurt was produced from raw milk by incorporating a nisin-producing strain, *Lactococcus lactis* subsp. lactis, along with the traditional yogurt culture consisting of *Streptococcus salivarius* subsp. thermophilus (ST) and *Lactobacillus delbrueckii* subsp. bulgaricus (LB). Yamauchi et al. teach that the lactococci are needed to secrete the nisin, whose effect is to retard the activity of ST and LB. The resulting yogurt therefore contains the lactococci used to produce the nisin. Nonetheless, the acidity of yogurt containing the nisin-producing bacteria increased by 64% to 96% in 14 days, in various experiments inoculated with differing amounts of *L. lactis* subsp. lactis, compared to the initial acidity at the completion of fermentation. Other studies (Hogarty et al., J. Food Protection 45:1208–1211 (1982); Sadovski et al., XX International Dairy Congress, Vol. E: 542–5–44 (1978)) also noted acid production and development of bitterness at low temperature by some mesophilic starter lactococci in dairy products.

In U.S. Pat. No. 5,015,487 to Collison et al., the use of nisin, as a representative of the class of lanthionine bacteriocins, to control undesirable microorganisms in heat processed meats is disclosed. In tests involving dipping frankfurters in nisin solutions, the growth of *L. monocytogenes* was effectively inhibited upon storage at 4° C.

Chung et al. (Appl. Envir. Microbiol. 55, 1329–1333 (1989)) report that nisin has an inhibitory effect on gram-positive bacteria, such as *L. monocytogenes, Staphylococcus aureus* and *Streptococcus lactis*, but has no such effect on gram-negative bacteria such as *Serratia marcescens, Salmonella typhimurium* and *Pseudomonas aeruginosa* when these microorganisms are attached to meat.

Nisin has been added to cheeses to inhibit toxin production by *Clostridium botulinum* (U.S. Pat. No. 4,584,199 to Taylor). U.S. Pat. No. 4,597,972 to Taylor discloses a detailed example in which chicken frankfurter components are shown to require the presence of both added nitrite and added nisin in order to prevent or delay botulinum toxin production when challenged with *C. botulinum*.

In U.S. Pat. Nos. 4,888,191 and 5,017,391, Anders et al. disclose compositions and methods related to the use of lactate salts to delay *C. botulinum* growth in a foodstuff such as fish or poultry. The foods are heated to a temperature sufficient to cook the meat but not to sterilize the product. Anders et al. suggest that lactate may be used alone, or in combination with other agents such as sodium nitrite. These patents fail to discuss nisin or its properties.

Maas et al. (Appl. Envir. Microbiol. 55, 2226–2229 (1989)) report that lactate, when incorporated into a turkey meat vacuum-packed composition, delays the generation of botulinum toxin in a manner directly dependent on the concentration of lactate introduced into the composition. Maas et al. do not mention nisin.

As shown herein, commercially produced cream cheese compositions are readily contaminated by microorganisms. Accordingly, there is a need for cream cheese compositions and methods of producing them that inhibit the growth of objectionable and pathogenic microorganisms, using natural or innocuous ingredients. In particular, there is a need for such compositions and methods that avoid the introduction of artificial or synthetic preservatives, the use of which has led sectors of the consuming public to avoid purchasing products containing such preservatives. The present invention addresses this need.

SUMMARY OF THE INVENTION

The present invention provides a stabilized cream cheese composition comprising a cream cheese stabilized with a nisin-producing fermentation. The product may be a cream cheese prepared with a fermentation mix fermented with a nisin-producing culture or it may be a cream cheese to which a nisin-containing whey is added; alternatively the cream cheese composition may comprise both types of products (i.e., a mixture of a cream cheese prepared with a fermentation mix fermented with a nisin-producing culture and a cream cheese to which a nisin-containing whey is added).

In an important embodiment, the nisin-containing whey is prepared by inoculating a pasteurized dairy composition with a culture of a nisin-producing microorganism, incubating the composition until the pH attains a value between about 6.2 and about 4.0 and a whey and curd mixture is formed, and separating the whey from the whey and curd mixture to give the separated whey which is the nisin-containing whey. In an alternative embodiment, the nisin-containing whey is obtained from the fermentation of a fortified cheese whey composition using nisin-producing microorganisms. The stabilized cream cheese composition described inhibits the growth of objectionable or pathogenic microorganisms. In important embodiments of the stabilized cream cheese composition the fermentation product is nisin-containing whey added in a proportion from about 0.5% to about 25% by weight. In even more important embodiments, the proportion of nisin-containing whey ranges from about 5% to about 15% by weight.

The invention also provides a method of making a stabilized cream cheese composition, and a method of inhibiting the growth of objectionable or pathogenic microorganisms in a cream cheese composition. The methods include preparing cream cheese curds using either a conventional cream cheese fermentation or a fermentation including a nisin-producing culture, and adding a suspension of a vegetable gum in nisin-containing whey to the composition.

BRIEF DESCRIPTION OF THE DRAWING

FIG. 1 provides a flow chart of steps used in the production of nisin-containing whey.

FIG. 2 provides a flow chart of steps used in the production of a cream cheese composition.

FIG. 3 provides a flow chart for preparation of a cream cheese product. A 50:50 blend of a cream cheese flavor culture with a cream cheese mix cultured with a nisin-producing strain is prepared. The blend is then treated either with dry carob gum or with a slurry of carob gum in nisin-containing whey.

DETAILED DESCRIPTION OF THE INVENTION

This invention relates to a stabilized preparation of cream cheese and to methods of preserving cream cheese and of inhibiting the growth of objectionable or pathogenic microorganisms in preparations of cream cheese. The preparation and methods may include fermenting a cream cheese mix with a nisin-producing culture and/or the addition of nisin-containing whey to a cream cheese composition, in order to stabilize the cream cheese products. The preservative and stabilizing effects of nisin-containing whey find application in the preparation of other food products in addition to stabilized cream cheese. These include stabilized dairy compositions (e.g., yogurt), cooked meat products, and mayonnaise-type spreads. Disclosures of these inventions, which are related to the instant application, appear in the applications entitled "Stabilization of Fermented Dairy Compositions Using Whey from Nisin-Producing Cultures", U.S. Ser. No. 60/098,518, filed Aug. 31, 1998, "Stabilization of Cooked Meat Compositions Using Whey from Nisin-Producing Cultures", U.S. Ser. No. 60/098,465, filed Aug. 31, 1998, and "Stabilization of Mayonnaise Spreads Using Whey from Nisin-Producing Cultures", U.S. Ser. No. 60/098,516, filed Aug. 31, 1998, respectively, and are incorporated hereby in their entireties by reference.

For purposes of this invention, the term "nisin-containing whey" is intended to include the whey product, separated from the curd, derived from a nisin-producing culture. Generally, such a nisin-containing whey is obtained by any of a variety of equivalent procedures involving the fermentation of a nisin-producing microorganism. In one such procedure, a pasteurized dairy product such as milk or whey is first inoculated with the nisin-producing microorganism. After the dairy product curdles, the nisin-containing whey is separated from the curds of the curdled culture. The curds and whey can be separated by any conventional technique, including, for example, centrifugation, filtration, and the like. This method effectively removes most or essentially all of the microorganisms in the nisin-containing whey. In an alternative procedure, the nisin-containing whey is obtained from the fermentation of a fortified cheese whey composition using nisin-producing microorganisms. In this procedure, after the pH in the fermentation has fallen to about 5.5, the pH is then maintained at this value for 8–10 hrs before allowing the pH to drop further. In certain cases presented below, the nisin-containing whey, separated from the corresponding curds, is then employed in the products and methods of this invention. In other cases, a nisin-producing culture is used to ferment a cream cheese mix and the cream cheese curds resulting therefrom are retained.

It is shown in the copending application entitled "Stabilization of Fermented Dairy Compositions Using Whey from Nisin-Producing Cultures", U.S. Ser. No. 60/098,518, filed Aug. 31, 1998, that nisin-containing whey has effects on nonpathogenic microorganisms beyond those obtained by addition of a purified preparation of nisin. Furthermore, it is shown in Example 2 that nisin-containing whey contains, or preserves, a significant concentration of lactate characteristic of whey. Thus nisin-containing whey may in general be understood to contain both nisin and lactate.

The fermenting cultures capable of producing nisin-containing whey have the potential of secreting many fermentation products into the medium, namely, into the whey of the culture. Thus, in addition to nisin and lactate, there may be further components present in nisin-containing whey produced by the fermentations yielding this whey. Such components may contribute to the beneficial properties of the preservable preparations of the invention, and to the beneficial effects of the methods of the invention. Without wishing to limit the scope of this invention, therefore, the term "nisin-containing whey" encompasses all components contained therein, both those currently known and those which may remain uncharacterized at the present time, that contribute to the beneficial attributes of the present invention.

As used herein, "nisin-containing whey" also relates to the whey described above that has subsequently been reduced in volume to a more concentrated liquid, or that has been completely dried, by evaporation, lyophilization or comparable procedure. The term relates additionally to such a concentrated or dried whey that is subsequently reconstituted, either partially or completely, by the addition of water or a water-containing composition.

The nisin-containing whey used in this invention may be obtained using a procedure that includes the following steps: (i) pasteurizing a dairy liquid such as milk, whether whole milk, partially defatted milk or skim milk, (ii) cooling and inoculating the liquid with a culture of a nisin-producing microorganism, (iii) incubating until the pH has fallen to a range of 4.4 to 4.8 as a result of the fermentation, whereupon a suspension of curds in liquid whey is formed, and (iv) separating the curds from the whey, for example by centrifugation or filtration (see FIG. 1). Alternatively, nisin-containing whey may be prepared by the sequential steps of (i) preparing an aqueous composition comprising sweet whey from the fermentation of a cheese, whey protein concentrate, and a protein hydrolysate; (ii) fermenting the aqueous composition with a nisin-producing culture until the pH attains about 5.5; (iii) maintaining the pH of the fermenting composition at about 5.5 for 8–10 hrs; and (iv) allowing the pH of the fermenting composition to drop to 4.8 or lower. An example of a nisin-producing microorganism is *Lactococcus lactis* subsp. lactis. The resulting whey is the nisin-containing whey of the invention.

As used herein, the term "stabilized preparation" as applied to cream cheese compositions relates to a preparation which has been treated so that the growth of objectionable or pathogenic microorganisms that may potentially contaminate the preparation is inhibited or is retarded. Such objectionable or pathogenic microorganisms include, but are not limited to, molds, yeasts, lactobacilli, lactic acid cocci, and aerobic sporeforming bacilli.

As shown in the copending application entitled "Stabilization of Fermented Dairy Compositions Using Whey from Nisin-Producing Cultures", U.S. Ser. No. 60/098,518, filed Aug. 31, 1998, nisin-containing whey has beneficial effects when incorporated into fermented dairy products such as yogurts, buttermilks, and sour creams. Yogurt is generally made by fermenting milk with a culture that contains thermophilic organisms such as *Streptococcus salivarius* subsp. thermiophilus (ST) and *Lactobacillus delbrueckii* subsp. bulgaricus (LB). Additional cultures such as *Lactobacillus acidophilus* and bifidobacteria may also be included. Conventional fermented dairy products such as these continue to form acidic products, and in some cases, to develop bitterness, upon storage over times routinely involved in shipping them, retailing, and storage. The addition of nisin-containing whey to such fermentations inhibits these undesired effects, conferring beneficial stability and taste to the products. These effects appear not to be due to the presence of lactate in the nisin-containing whey, however, since all lactic fermentations, by their nature, produce lactic acid and yet are not stable to storage.

These effects on dairy cultures furthermore cannot be achieved by the addition of purified nisin to the cultures. Introducing purified nisin in milk prior to fermentation (Bayoumi, Chem. mikrobiol. technol. lebensm. 13:65–69 (1991)) or following fermentation (Gupta et al., Cultured Dairy Products Journal 23: 17–18 (1988); Gupta et al., Cultured Dairy Products Journal 23: 9–10 (1989)) only partially inhibited the rate of post-fermentation acidification, and the yogurt continued to become more acidic throughout its shelf life. Thus nisin alone is not capable of preventing continued acidification; as shown in the Examples; nisin-containing whey is required to achieve these results. It may be inferred that nisin-containing whey may also contain additional components currently not identified that contribute to the attainment of these beneficial effects. As noted above, the lactate found in nisin-containing whey does not appear to be responsible for these properties.

The present inventors have directed their attention to the problem identified above under "Background of the Invention", namely, the difficulty that, upon sustained storage, conventional cream cheese compositions develop growths of objectionable or pathogenic microorganisms. Such growths may arise even though the storage remains under conditions, including refrigeration, generally understood to inhibit such growth. In addressing this problem, the inventors performed extensive studies of microbiological contamination of manufacturing facilities and ingredients used in the preparation of cream cheese compositions.

As a result of these studies, the inventors succeeded in identifying various causes or factors likely to contribute to the contamination of the cream cheese compositions. These factors appear not to be recognized in the field, or, if recognized, appear to be overlooked by workers of skill in this field. A significant finding of these investigations is that vegetable gums, such as guar gum or carob gum, that are added to cream cheese compositions are generally contaminated by both molds and aerobic sporeforming bacilli. A general practice in the art of preparing cream cheese compositions is to add the vegetable gum to the composition in the dry state. The inventors unexpectedly discovered two corollary results of this practice that appear to be of great significance in contributing to the problem of microbiological contamination.

First, the gums, once added to the compositions and suspended therein, may nevertheless not be completely dispersed, such that, even if the temperature of addition and processing remains elevated, bacilli contained in the gum are not effectively killed. The inventors found that bacilli remain viable upon heat inactivation whereas molds are more susceptible to such treatment. Thus the process of adding contaminated vegetable gums constitutes a primary source of microbiological contaminants whose viability remains high in the final composition. Second, the inventors conducted extensive site specific studies of environmental contamination within the manufacturing facilities involved in producing cream cheese compositions. They found pervasive contamination by both molds and aerobic sporeforming bacilli at various locations within the facilities. The highest levels were found in those sections involved in manipulating the dry vegetable gums. Most areas in the facilities, however, revealed the presence of contaminants. The inventors concluded that molds and spores from the vegetable gums become airborne in the rooms in which they are manipulated, and that both environmental air flow and physical movement of workers are effective to translocate the contaminants to remote sections of the facility.

Figure 2:
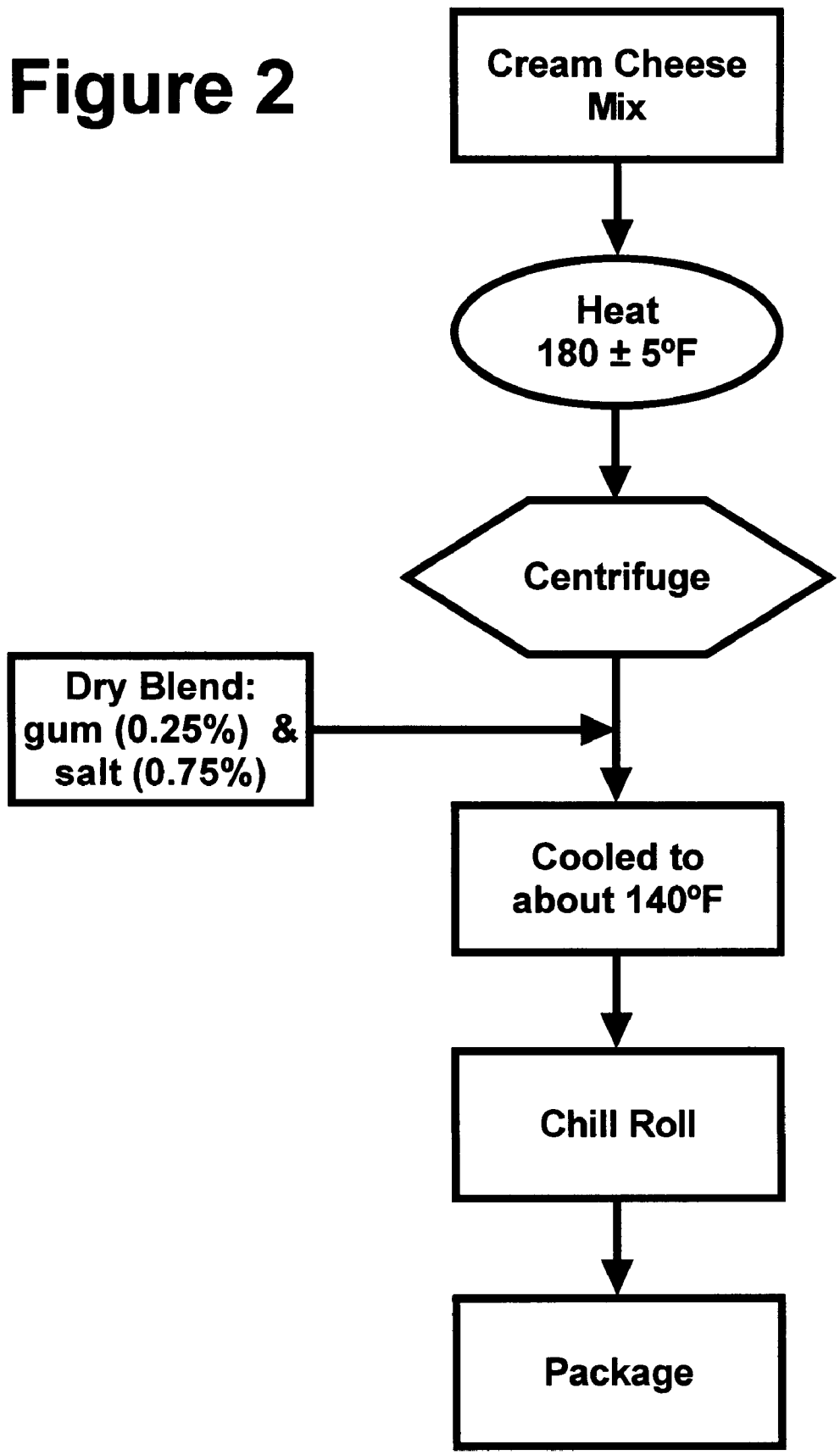

Conventional cream cheese compositions are prepared by methods well known in the art. For example, a cream cheese mix containing milk and cream is prepared and blended. A cream cheese culture, containing cultures such as *Lactococcus lactis* ssp. *lactis/cremoris, L. lactis* ssp. lactis, biovar. diacetylactis, and *Leuconostoc mesentroides* ssp. cremoris, is added and fermentation is allowed to proceed until the pH is about 4.5 to about 4.6. After a heat treatment to inactivate the culture, the cream cheese curd is separated from the whey. After adding a vegetable gum to the curd, the cream cheese product is packaged for storage and shipment. These steps are shown schematically in FIG. 2.

The inventors have overcome the problem of microbiological contamination by incorporating components from a nisin-producing culture to form the cream cheese compositions of the invention. Nisin-containing whey was found to inhibit the growth of aerobic sporeforming bacilli. Such bacilli provide good models for the typical contaminants that may occur in cream cheese compositions prepared in the field. In an important embodiment of a method employed to prepare cream cheese compositions stabilized by the incorporation of nisin-containing whey, the vegetable gum is suspended in the whey and allowed to disperse therein. Only after the suspension becomes relatively homogeneous is the gum-whey suspension added to the cream cheese curd. In a further practice of this embodiment, the resulting gum/whey mixture is retained at an elevated temperature for a sufficient time to lower the viability of the molds that may originally have been present in the vegetable gum. Additionally, at least a portion of the cream cheese curd may be prepared using a nisin-producing culture.

The cream cheese compositions of the invention have a greatly lowered microbiological burden. This leads to enhanced storage stability and a higher level of customer satisfaction. These improvements are implemented without sacrificing the physical and flavoring attributes of the cream cheese products.

EXAMPLES

General Methods

Aerobic plate count was performed using the procedure outlined in Bacteriological Analytical Manual (Food and Drug Administration, 8th Edition, 1995, Chapter 3). The plating medium used was brain heart infusion (BHI) agar. *Streptococcus salivarius* subsp. thermophilus (ST) was enumerated on M17 agar (Atlas, R. M., 1993, Handbook of Microbiological Media, CRC Press, Inc. Pages 148, 532, 621). *Lactobacillus bulgaricus* (LB) was enumerated on MRS agar (Atlas). The plates for ST and LB were incubated anaerobically at 40° C. for two days. The nisin producing lactococci were enumerated on BHI agar, incubated anaerobically at 30° C. for two days.

Nisin activity in the fermented milk was determined by the method of Fowler et al. (Techn. Series Soc. Bacteriol. 8:91–105 (1975)). The strain *L. lactis* subsp. cremoris that is sensitive to nisin was used as an indicator. Nisaplin™, a standardized preparation of nisin ($10^6$ units/g) from Aplin and Barrett, was used as the standard to determine nisin activity in various preparations. Each assay plate had nisin standards.

PRODUCTION OF NISIN-CONTAINING WHEY AND USE IN DAIRY PRODUCTS

Example 1

This example illustrates the production of nisin-containing whey from a nisin-producing culture. The significant steps involved are shown schematically in FIG. 1. A nisin-producing culture was inoculated at $5 \times 10^6$ cfu/ml in pasteurized skim milk cooled to 30° C. The mixture was allowed to incubate for about 16 hours and was then cooled to 5–7° C. The fermented milk had about $8.0 \times 10^8$ cfu/ml of the cultured bacteria, a pH of about 4.4 to 4.6, and a titratable acidity of 0.75%. It contained nisin equivalent activity of about 1300 international units/ml as determined by well assay using a nisin-sensitive strain of *Lactococcus lactis* subsp. *cremoris*. The cultured milk was centrifuged to separate the whey from the curd and the nisin-containing whey removed. A detailed comparison between the fermented milk and the resulting whey is given in Table 1. The whey contained more than about 100-fold fewer cfu/ml of the nisin-producing microorganisms compared to the fermented milk culture while still preserving the full nisin activity of the fermented milk. The curd retained more than 99% of the lactococcus counts determined for whey and curd together.

TABLE 1

Characteristics of Centrifuged Nisin-Containing Whey Obtained from Lactococcus-Fermented Skim Milk

|  | Fermented | Whey | Curd |
| --- | --- | --- | --- |
| pH | 4.43 | 4.45 | 4.5 |
| Titratable acidity | 0.75% | 0.54% |  |
| Culture count | $8.0 \times 10^8$ cfu/ml | $6.6 \times 10^6$ cfu/ml | $3.9 \times 10^9$ cfu/g |
| Nisin equivalent activity | 1300 IU/ml | 1300 IU/ml | 600 IU/g |

Example 2

This example also illustrates the preparation and properties of a nisin-containing whey derived from a nisin-producing culture. Milk was fermented with approximately $5 \times 10^6$ cfu/g nisin-producing lactococci until the culture attained a pH of 4.43. The fermented milk was then centrifuged at 10,000 rpm for 15 minutes and the supernatant (i.e., whey) was recovered. The whey had a pH of 4.45 and a nisin activity of about 1300 IU/ml (essentially the same values as in the fermented milk prior to centrifugation). The whey had a culture population of $6.6 \times 10^6$ cfu/ml (as compared to $8.0 \times 10^8$ cfu/ml in the original fermented milk; see Table 1). The whey recovered from a dairy fermentation of nisin-producing microorganisms has a titer of nisin-producing lactococci that is less than about 1% of that of the fermentation prior to separation of the whey.

In a second run, a skim milk/whey mixture was fermented at pH 5.5 for about 8–10 hours and then allowed to acidify further to a pH of about 4.6. The resulting nisin-containing whey from a pH controlled propagation had a pH of about 4.65, a lactate concentration of about 13.05 g/L, and a nisin activity of about 2,100 U/g.

Example 3

This example provides an alternative fermentation for nisin-containing whey yielding a high level of nisin equivalent activity. Sweet whey from fermentations of cheeses such as Swiss cheese, Parmesan cheese, mozzarella cheese, or cheddar cheese is fortified with whey protein concentrate (WPC) and a protein hydrolysate which may be, for example N-Z amine™ or soy protein hydrolysate. The components are blended with water as shown:

| | |
|---|---|
| Cheese whey (Krafen ™) | 3.8% (total solids basis) |
| WPC | 2.9% |
| Protein hydrolysate | 0.1% |
| Water | 93.2% |

The blended formulation (pH~6.1–6.25) is autoclaved, cooled, and inoculated with a nisin-producing culture at 0.1–1.0%. The fermentation is allowed to proceed to pH 5.5 with stirring, which requires about 7–8 hrs. The pH is then maintained at pH 5.5 for 8–10 hrs by the addition concentrated NaOH by means of a pH controller. The pH regulation is then stopped and the pH allowed to drop to pH 4.8 or lower, at about 22 hrs of total fermentation time. This resulting preparation has a nisin activity of about 2100–2800 IU/g. If necessary it may be centrifuged in order to use the supernatant only, or the whole fermented whey may be used directly.

MICROBIOLOGICAL CONTAMINATION AND STABILIZATION OF CREAM CHEESE

Example 4

Detection of Microbiological Contaminants in a Manufacturing Facility

Samples to be assayed for microbiological contaminants were obtained from the environment, from ingredients and various process samples, and from finished products, in a typical manufacturing facility for the production of cream cheese products. Table 2 shows the microbial load found for different locations in the facility. Specific assays were conducted for yeast, mold, and sporeformers. The separator/blender area showed a high level of mold and yeast. The other areas also showed the presence of mold and yeast in the environment. Considerable blowing and dusting of dry gum was noted on the blenders and other surfaces. Scrapings from a surface near the blenders were high in mold (1380/g). In addition to yeast, mold, and sporeformers, other organisms, such as gram negative bacteria and catalase-positive cocci, were also detected (data not shown).

TABLE 2

Microbial Fallout from the Ambient Environment at Selected Locations in a Manufacturing Facility.

| Location | Total Microbial Load | Yeast and Mold |
|---|---|---|
| Separator/Blender Area | 20.4/sq. in. | 2.13/sq. in. |
| Chill Roll Room | 0.23 | 0.023 |
| Rigid Box Fill Room | 0.23 | 0.084 |
| Soft Body Fill Room | 0.41 | 0.26 |
| Soft Body Blender Room | 2.63 | 0.48 |
| Free Cook Room | 0.32 | 0 |

The separator/blender area samples were gathered over 12 hours. The remaining samples were gathered over 7 hours.

The separator/blender area shows high levels of yeast, mold, and other microbiological contaminants in the environment. Other areas show lower levels of contamination. The increased incidence of mold in the separator/blender area appears to be caused by the blowing of gum dust carrying the mold. Aerobiological dry dissemination of mold-laden gum throughout the various areas in the facility, especially in the filling rooms, enhances a risk of contamination in the cream cheese products.

Microbiological contaminants were assayed in samples taken from ingredients, from curd during manufacture, and from finished products at the same facility and at the same time as the environmental samples analyzed above were taken. The results are given in Table 3. The data show that the finished products contained no mold or starter organisms, but do have overall low level contamination from sporeforming organisms.

TABLE 3

Microbiological Profile of Gum, Cream Cheese Curd, and Finished Products from a Typical Manufacturing Facility.

| Substance | Total Counts/g | Mold Counts/g |
|---|---|---|
| Cream cheese curd during manufacture | 85–187 | 0 |
| Gum-salt blend | 63–76 | 32–35 |
| Regular soft cream cheese | 46–58 | 0 |
| Regular brick cream cheese | 26–68 | 0 |

Example 5

Microbiological Contaminants in Commercial Gums.

Vegetable gums used in manufacturing cream cheese were assayed for contaminants. The results are shown in Table 4. High levels of both mold and bacillus species were found.

TABLE 4

Mold and Bacillus in Commercial Gums

| | Mold (cfu/g) | Bacillus (cfu/g) |
|---|---|---|
| Carob gum | $108 \times 10^2$ | $58 \times 10^2$ |
| | $3 \times 10^2$ | $31 \times 10^2$ |
| | $66 \times 10^2$ | $1.5 \times 10^5$ |
| Carob gum, irradiated | — | 3 |
| Guar gum | $100 \times 10^2$ | $44 \times 10^2$ |
| GFS (mixed xanthan, guar, and carob gums from Kelco) | $3 \times 10^2$ | $154 \times 10^2$ |

Example 6

Aerobic Sporeformers in Commercial Samples of Cream Cheese

Three samples of conventional cream cheese (not containing nisin in any form) manufactured at different facilities were assayed for aerobic sporeformers. A commercial cream cheese product containing purified nisin was also analyzed; the packaging indicates that the product may be displayed without refrigeration for 30 days. The results are shown in Table 5. The commercial products have a significant content of aerobic sporeformers. Furthermore, the purified nisin-containing product has a much higher content of sporeformers in spite of its purified nisin content. It appears that commercial samples of cream cheese generally contain aerobic sporeforming contaminants, and that purified nisin does not inactivate or eliminate such contaminants.

TABLE 5

Aerobic Sporeforming Content in Commercial Cream Cheese

| Cream Cheese | Aerobic Sporeformers, cfu/g |
|---|---|
| Conventional from Midwest | 29 |
| Conventional from Northeast | 44 |
| Conventional from West | 46 |
| Commercial with Purified Nisin | 254 |

Microbiological contaminants present in cream cheese cake products were assayed and some of the species present were identified. The assay results are presented in Table 6. The organisms positively identified were *Bacillus cere us, B. licheniformis, B. subtilis, B. megaterium, B. macerans*, and *B. pumilus*. Of these, *B. cereus, B. licheniform*, and *B. pumilus* are associated with food poisoning. Other unidentified species were also present.

TABLE 6

Aerobic Sporeformers Found in Commercial Cream Cheese Cake Samples

| Sample | pH | Initial | 7 days, 20° C. |
|---|---|---|---|
| New York Style Cheese Cake, Refrigerated | 4.92 | 36 cfu/g | 25 cfu/g |
| Original Plain Cheese Cake, Frozen | 4.80 | 37 | 5 |
| Plain Cheese Cake, Frozen | 5.06 | 71 | $1.0 \times 10^4$ |

Example 7

Heat Inactivation of Mold and Aerobic Sporeforming Bacilli in Cream Cheese

The minimum temperature required to inactivate mold and aerobic sporeforming bacilli was determined. Production samples of cream cheese were heated to various temperatures in the range 155–170° F. and inoculated with a mold cocktail at $9.5 \times 10^4$ mold/g. The inoculated cheese samples were held at the desired temperature for 15 minutes. Samples were then cooled and plated to determine the count of remaining sporeformers and mold. The results are shown in Table 7. It is apparent that heating at 165° F. for 15 minutes is sufficient to reduce the mold count to below $10^{-4}$ of the starting count. This finding may account for the apparent absence of mold count in the cream cheese product of Example 3 (Table 3). However, none of the heat treatments applied in this experiment have any effect on the aerobic sporeformers added to the sample. Thus a treatment other than heat is needed to inhibit the growth of the latter microorganisms.

TABLE 7

Susceptibility of Aerobic Spores and Mold Spores in Cream Cheese to Heat Treatment

| Temperature, ° F. | Time, min | Aerobic Sporeformers, cfu/g | Mold, cfu/g |
|---|---|---|---|
| 155° F. | 0 | 58 | 90 |
|  | 15 | 94 | 5 |
| 160° F. | 0 | 60 | 38 |
|  | 15 | 71 | 1 |
| 165° F. | 0 | 62 | 30 |
|  | 15 | 76 | 0 |
| 170° F. | 0 | 73 | 2 |
|  | 15 | 78 | 0 |

Example 8

Inactivation of Aerobic Sporeforming Bacteria with Nisin-Containing Whey

Vegetable gums were hydrated with water or with nisin-containing whey, to a concentration of 1%. The samples were then heated at 175° F. for 10 min., and the content of bacterial spores was assayed. The results are shown in Table 8. It is seen that heating the gums in nisin-containing whey inactivates the spores. These samples were maintained at room temperature for several days further, and showed no evidence of bacterial growth in that time.

TABLE 8

Inactivation of Bacterial Spores in Nisin-Containing Whey by Heating.

| Gum | Water, unheated | Water, after heat treatment | Whey, unheated | Whey, after heat treatment |
|---|---|---|---|---|
| Carob | >300 | 586 | — | 0 |
| Guar | — | — | 44 | 0 |
| GFS | — | — | 154 | 0 |

The effectiveness of nisin-containing whey in controlling sporeforming microorganisms in carob gum was assessed. Slurries at 3% were prepared in water with untreated or irradiated carob gum, or with untreated gum in nisin-containing whey. The counts of bacteria and mold were then obtained. The results are shown in Table 9. It is seen that treatment by nisin-containing whey is the most effective, completely inhibiting the growth of the sporeforming organisms present in the gums.

TABLE 9

Growth of Sporeforming Microorganisms in 3% Slurries of Carob Gum.

| Treatment | Bacteria, counts/g | Mold, counts/g |
|---|---|---|
| None | 149 | 34 |
| Irradiated | 3 | 0 |
| Nisin-containing whey | 0 | 0 |

The carob gum samples described in the preceding paragraph were used to prepare cream cheese. The spore counts of the resulting products were determined. The results appear in Table 10. They show that use of nisin-containing whey is most effective to minimize the content of sporeforming microorganisms in the final cream cheese product.

In view of the result shown in Example 5, Table 5, in which the commercial product containing purified nisin is ineffective in controlling sporeforming microorganisms, the present results obtained using nisin-containing whey are surprising and unexpected.

TABLE 10

Count of Sporeforming Microorganisms in Cream Cheese Produced Using Carob Gums Treated as in Table 9.

| Treatment | Counts/g |
|---|---|
| None | 7.6 |
| Irradiated | 10.6 |
| Nisin-containing whey | 2.6 |

Example 9

Effects of Suspending Vegetable Gums in Nisin-Containing Whey on Bacterial Counts in Gums, Curds, and Cream Cheese Products Use of nisin-containing whey as a medium for preparing slurries of vegetable gums, compared with use of sterile water, was studied. The effects on the viability of *B. licheniformis* and *B. subtilis* in the slurries, in cream cheese curds, and cream cheese final products, were examined. Spores were heat-shocked at 145° F. for 30 min prior to inoculation. Slurries of the gum were inoculated at $10^4$ cfu/g. Cream cheese mix was inoculated at about $10^3$ cfu/g. Table 11 presents the results for treatment of carob gum with nisin-containing whey. It is seen that treatment of 3% slurries of carob gum in nisin-containing whey by heating at 175° F. for 10 min. completely inactivates bacillus spores, whereas heat treatment of gum in water does not.

TABLE 11

Bacillus and Mold Content of Carob Gum

| Sample | Bacillus, cfu/g | Mold, cfu/g |
|---|---|---|
| Uninoculated | 107 | 18 |
| Inoculated with bacillus | $6.5 \times 10^3$ | 18 |
| Inoculated slurry in water @ 175° F. for 10 min | 199 | 0 |
| Inoculated slurry in whey @ 175° F. for 10 min | 0 | 0 |

Figure 3:
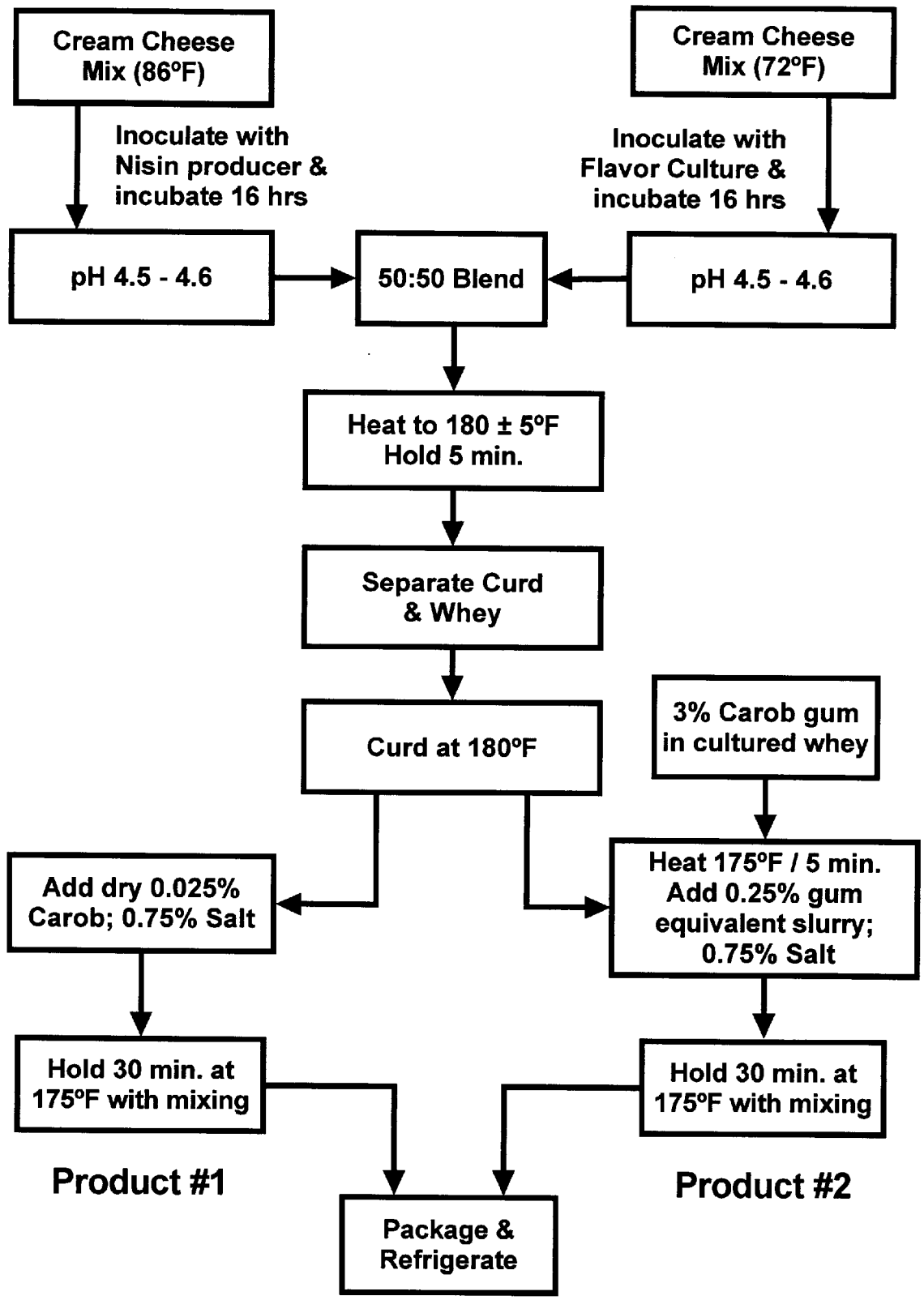

The bacillus count was determined in cream cheese products obtained by fermenting cream cheese mix with either conventional cream cheese culture, or with a culture of nisin-producing bacteria. After fermenting for 16 hours, it was found that the bacillus counts in these two preparations were approximately the same (about $1.4 \times 10^3$ cfu/g). Subsequently, the curds from each of these preparations were obtained. Prior to separating the curds, the fermentation was heated at about 180° F. for 5 min. An additional cream cheese curd sample was prepared as shown in FIG. 3. A 50:50 blend of a fermentation using cream cheese culture and a fermentation using a nisin-producing culture was prepared, and the curds obtained as above. The bacillus counts were determined for the three samples, and the results are presented in Table 12. It is seen that in the 50:50 blend, the bacillus count is significantly less than half that expected simply by blending the two component curd preparations.

TABLE 12

Bacillus Counts in Cream Cheese Curds after Treatment at 180° F.

| Cream Cheese Curds | Bacillus, cfu/g |
|---|---|
| Regular culture | 900 |
| Nisin culture | 23 |
| 50:50 blend | 111 |

The curds of the 50:50 blend were combined either with a 0.25% slurry of carob gum in nisin-containing whey or with dry carob gum. The compositions were also adjusted to contain 0.75% salt. The cream cheese products were prepared as shown in FIG. 3, at the bottom of the flow diagram. The bacillus count of the various preparations was obtained. The results are shown in Table 13, and indicate that use of nisin-containing whey is highly effective in inhibiting the viability of sporeforming bacillus in the products. Use of nisin-producing culture in the fermentation step is synergistic with use of nisin-containing whey in the step involving addition of the carob gum slurry. These results show unexpectedly effective inactivation of bacillus species in a cream cheese product prepared according to the present invention which is not attained using regular cream cheese fermentation and dry carob gum.

TABLE 13

Bacillus Counts in Cream Cheese Products

| Cream Cheese Culture | Carob Gum Preparation | Bacillus, cfu/g |
|---|---|---|
| Regular | Dry | 640 |
| Regular | Nisin-containing whey | 26.4 |
| Nisin culture | Nisin-containing whey | 1.2 |
| 50:50 Blend, regular:nisin | Nisin-containing whey | 7.4 |

Example 10

Flavor Profile of Cream Cheese Produced Using Nisin-Producing Culture

The physical properties and volatile flavoring compounds in regular cream cheese from a manufacturing facility, cream cheese fermented with flavor culture, and a 50:50 blend of cream cheeses fermented with flavor culture and containing nisin-producing cultures were examined. The results, shown in Table 14, show that the 50:50 blend retains the physical and flavoring attributes of manufactured and flavor cultured cream cheeses.

TABLE 14

Physical Properties and Volatile Flavorings of Cream Cheese Products

| Property | Manufactured | Flavor | 50:50 |
|---|---|---|---|
| Fat (%) | 33.7 | 34.5 | 33.5 |
| Lactose (%) | 2.07 | 2.84 | 2.6 |
| Protein (%) | 7.0 | 7.1 | 6.8 |
| Moisture (%) | 54.8 | 54.2 | 55.0 |
| Salt (%) | 0.71 | 1.01 | 1.00 |
| pH | 4.54 | 4.60 | 4.56 |
| Spreadability (g) | 483 | 297 | 344 |
| Adhesion (g) | 114 | 64 | 84 |

TABLE 14-continued

Physical Properties and Volatile Flavorings of Cream Cheese Products

| Property | Manufactured | Flavor | 50:50 |
|---|---|---|---|
| Yield stress (N/m$^2$) | 8709.0 | 5379.0 | 6318.0 |
| Ethanol (ppm) | 4 | 6 | 6 |
| Acetone (ppm) | 2 | 1 | 1 |
| Diacetyl (ppm) | 1 | 10 | 5 |

These results, together with those presented in previous Examples, show that the present invention produces an acceptable cream cheese product having superior flavor and stability free of microorganisms.

We claim:

1. A method of making a stabilized cream cheese composition, said method comprising the step of preparing a cream cheese composition containing a stabilizing amount of a fermentation product from a nisin-producing culture, wherein the fermentation product is chosen from the group consisting of (1) cream cheese curds obtained from fermentation of a cream cheese mix using a nisin-producing culture, (2) nisin-containing whey, and (3) mixtures of cream cheese curds obtained from fermentation of cream cheese mix using a nisin-producing culture and nisin-containing whey, and wherein the fermentation product includes nisin-containing whey prepared by a process comprising the steps of (i) inoculating a pasteurized dairy composition with a culture of a nisin-producing microorganism;

(ii) incubating the composition until the pH attains a value between about 6.2 and about 4.0 and a whey and curd mixture is formed; and (iii) separating the whey from the whey and curd mixture, wherein the separated whey is the nisin-containing whey.

2. The method of making the stabilized cream cheese composition described in claim 1 wherein the fermentation product is nisin-containing whey added in a proportion from about 0.5% to about 25% by weight.

3. The method of making the stabilized cream cheese composition described in claim 2 wherein the proportion of nisin-containing whey ranges from about 5% to about 15% by weight.

4. A method of making a stabilized cream cheese composition, said method comprising the step of preparing a cream cheese composition containing a stabilizing amount of a fermentation product from a nisin-producing culture, wherein the fermentation product is chosen from the group consisting of (1) cream cheese curds obtained from fermentation of a cream cheese mix using a nisin-producing culture, (2) nisin-containing whey, and (3) mixtures of cream cheese curds obtained from fermentation of cream cheese mix using a nisin-producing culture and nisin-containing whey, and wherein the fermentation product includes nisin-containing whey prepared by a process comprising the sequential steps of (i) preparing an aqueous composition comprising sweet whey from the fermentation of a cheese, whey protein concentrate, and a protein hydrolysate;

(ii) fermenting the aqueous composition with a nisin-producing culture until the pH attains about 5.5;

(iii) maintaining the pH of the fermenting composition at about 5.5 for 8–10 hrs; and (iv) allowing the pH of the fermenting composition to drop to 4.8 or lower, wherein the resulting composition comprises the nisin-containing whey.

5. The method of making the stabilized cream cheese composition described in claim 4 wherein the fermentation product is nisin-containing whey added in a proportion from about 0.5% to about 25% by weight.

6. The method of making the stabilized cream cheese composition described in claim 5 wherein the proportion of nisin-containing whey ranges from about 5% to about 15% by weight.

7. A method of inhibiting the growth of objectionable or pathogenic microorganisms in a cream cheese composition, comprising the step of preparing a cream cheese composition that comprises a fermentation product from a nisin-producing culture in a cream cheese composition, wherein the proportion of the fermentation product is effective to inhibit the growth of objectionable or pathogenic microorganisms, wherein the fermentation product is chosen from the group consisting of (1) cream cheese curds obtained from fermentation of a cream cheese mix using a nisin-producing culture, (2) nisin-containing whey, and (3) mixtures of cream cheese curds obtained from fermentation of cream cheese mix using nisin-producing culture and nisin-containing whey, wherein the fermentation product which includes nisin-containing whey is prepared by a process comprising the steps of (i) inoculating a pasteurized dairy composition with a culture of a nisin-producing microorganism;

(ii) incubating the composition until the pH attains a value between about 6.2 and about 4.0 and a whey and curd mixture is formed; and (iii) separating the whey from the whey and curd mixture, wherein the separated whey is the nisin-containing whey.

8. The method described in claim 7 wherein the fermentation product is nisin-containing whey added in a proportion from about 0.5% to about 25% by weight.

9. The method described in claim 8 wherein the proportion of nisin-containing whey ranges from about 5% to about 15% by weight.

10. A method of inhibiting the growth of objectionable or pathogenic microorganisms in a cream cheese composition, comprising the step of preparing a cream cheese composition that comprises a fermentation product from a nisin-producing culture in a cream cheese composition, wherein the proportion of the fermentation product is effective to inhibit the growth of objectionable or pathogenic microorganisms, wherein the fermentation product is chosen from the group consisting of (1) cream cheese curds obtained from fermentation of a cream cheese mix using a nisin-producing culture, (2) nisin-containing whey, and (3) mixtures of cream cheese curds obtained from fermentation of cream cheese mix using nisin-producing culture and nisin-containing whey, wherein the fermentation product which includes nisin-containing whey is prepared by a process comprising the sequential steps of (i) preparing an aqueous composition comprising sweet whey from the fermentation of a cheese, whey protein concentrate, and a protein hydrolysate;

(ii) fermenting the aqueous composition with a nisin-producing culture until the pH attains about 5.5;

(iii) maintaining the pH of the fermenting composition at about 5.5 for 8–10 hrs; and (iv) allowing the pH of the fermenting composition to drop to 4.8 or lower, wherein the resulting composition comprises the nisin-containing whey.

11. The method of making the stabilized cream cheese composition described in claim 10 wherein the fermentation product is nisin-containing whey added in a proportion from about 0.5% to about 25% by weight.

12. The method of making the stabilized cream cheese composition described in claim 11 wherein the proportion of nisin-containing whey ranges from about 5% to about 15% by weight.

* * * * *